Patented Oct. 13, 1931

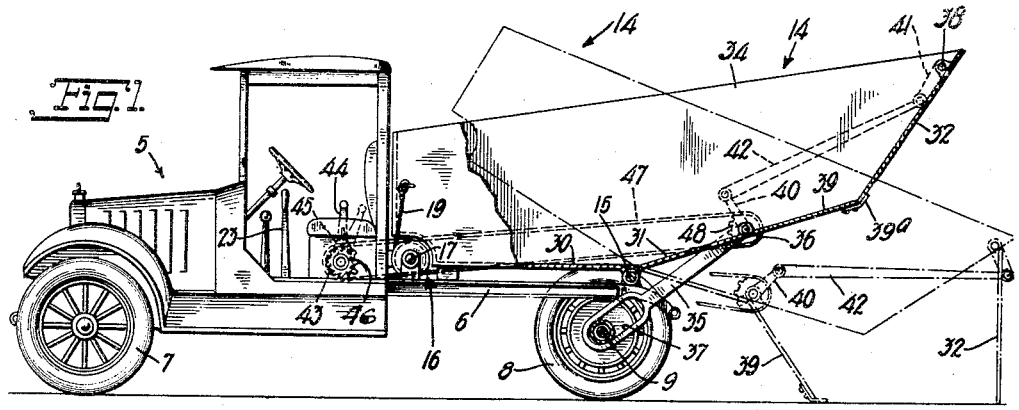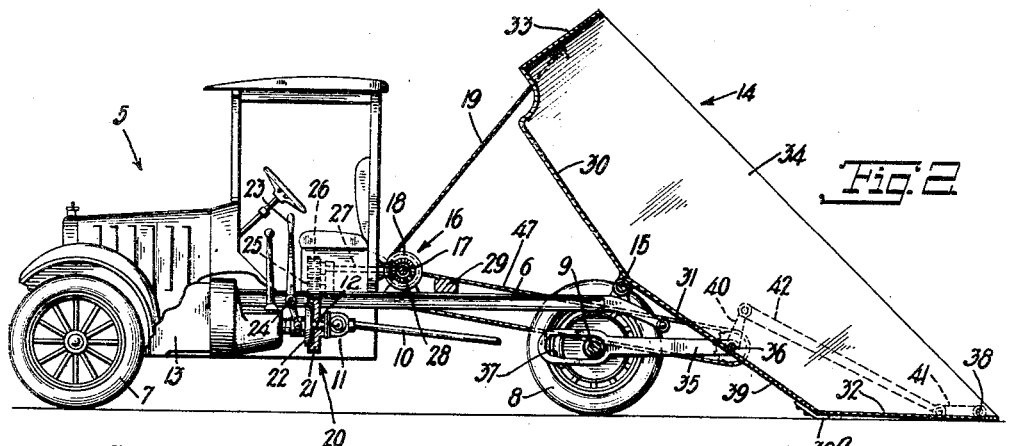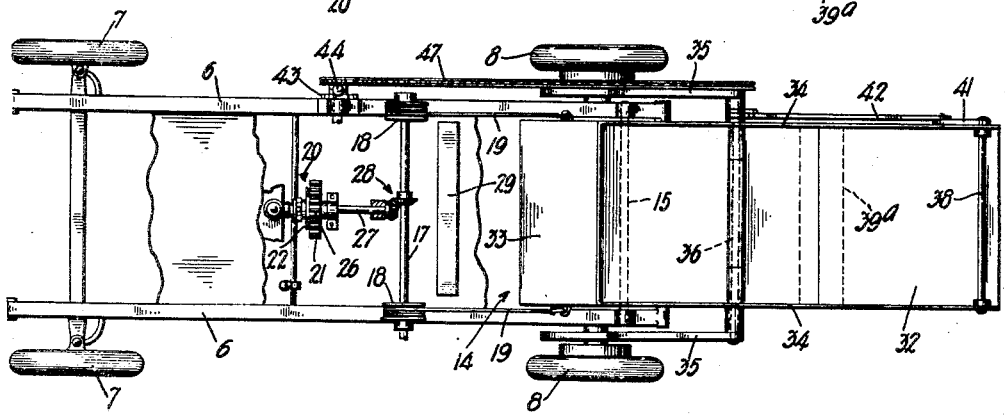

1,826,915

UNITED STATES PATENT OFFICE

FLOYD R. WOOSTER, OF WALDEN, NEW YORK

COMBINED LOADING AND DUMP CAR

Application filed August 17, 1927. Serial No. 213,501.

My invention relates to combined loading and dump cars.

An object of the invention is to facilitate the loading of the body by backing the car or truck into a pile of material with the body in a tilted position.

A feature of the invention relates to means to prevent further tilting of the body when loading. To this end there may be provided a pair of links which may be partially supported on the body and engage the rear axle to brace the body while it is being backed into a pile of material.

A further feature of the invention relates to the body, the floor of which is designed to pitch some of the material forward therein when the body is raised to carrying position.

A further feature relates to swingable floor sections which may be operated to assist in discharging the material from the body.

Still another feature of the invention relates to means for operating the floor sections to return them to normal.

Other features and advantages will hereinafter appear.

In the drawings which form part of the specification:

Fig. 1 is a side elevation, partly in section, of a truck showing my invention applied thereto;

Fig. 2 is a view, similar to Fig. 1, showing the body in its tilted position ready for loading;

Fig. 3 is a top plan view of Fig. 2, some of the parts being broken away for clearness.

I have herein illustrated the invention in connection with an automobile truck 5, which may be of any well known make, and includes a frame 6 supported, in a well known manner, on front wheels 7 and rear wheels 8; the rear wheels being connected to a rear axle 9 supported on the frame 6 in the usual manner. The rear axle 9 is driven in the usual manner by means including a drive shaft 10 connected by a universal 11 to a motor shaft 12 of a motor 13.

A body 14 is pivotally supported on the frame 6 by means of a rock shaft 15 so that it may be tilted from a carrying position (Fig. 1) to a loading position (Fig. 2).

When the body, which is shaped like a scoop, is in its loading position, it may be loaded by backing the truck, thus pushing the scoop shaped body into a pile of material such as snow, sand, crushed stone, etc. The body may then be swung back to its carrying position, by means hereinafter described, to transport the scooped up material; the center of gravity of the load being always slightly to the rear of the pivot 15 so that the body may be swung by gravity to the position in Fig. 2 to dump or discharge the material when desired.

To swing the body 14 back to its carrying position (Fig. 1), after it has been loaded (Fig. 2), there may be provided a windlass 16 including a shaft 17 rotatably supported on the frame 6 and having two pulleys 18, one at each side of the truck, to each of which there is connected one end of a cable 19 which may be wound on said pulleys by rotating the shaft 17 in a counter clockwise direction, by means hereinafter described, to thus swing the body back to its carrying position; the other ends of the cables 19 being connected to the forward portion of the body 14. The shaft 17 may be provided with any suitable locking means such as a pawl and ratchet, not shown, to lock the body in its carrying position. To release the shaft 17 when the load is to be dumped, it is merely necessary to swing the pawl out of engagement with the ratchet, whereupon the body is swung back by gravity to discharge the material. Any suitable form of friction device, not shown, may be connected to the shaft 17 to control the backward swing of the body so as to prevent the rear end of the body from unduly striking the ground, which may otherwise result in injury to the body.

To rotate the windlass shaft 17, in order to swing the body forward after it is loaded, there may be provided power driven means 20. The power driven means may include a clutch comprising a gear 21 loosely supported on the motor shaft 12. A circular friction element 22 is slidingly supported on the motor shaft 12 and connected to rotate therewith. Said element may be operated at will by a lever 23 pivoted at 24 to force the element 22, the edge of which is bevelled, into operative relation with the gear 21 to rotate the latter. The gear 21 is connected through an intermediate pinion 25 to drive a pinion 26 secured to a shaft 27; the shaft 27 being connected through bevel gears 28 with the shaft 17 to drive the latter and thus return the body to normal where it may be arrested against a cross bar 29 on the frame 6.

The scoop-like body 14 includes three floor sections 30, 31 and 32, namely a forward section, an intermediate section, and a rear section respectively. The body further includes a front wall 33 and two side walls 34. The rear section 32 is substantially horizontal or parallel with the ground when the body is in its loading position so that the body may readily be pushed into the pile of material from which a load is to be taken. While the body is being loaded, the material works itself over the intermediate section 31. While the body is being tilted back to normal, some of the material slides forward in the body onto the forward section 30, which is substantially horizontal when the body is in its carrying position, to distribute the load.

To prevent rotation of the body towards the ground about the shaft 15, and to reenforce it while loading, the body may be braced by means which may include two links 35 connected to a shaft 36 supported on the body 14. The links are provided with slots 37 to embrace the rear axle 9 to guide said links. It will be understood that as the body reaches the loading position, the axle engages in the ends of the slots 37 of the links 35 and thus the body is braced against the action of the material while loading. It will be understood that the links 35 when in engagement with the axle 9, as in Fig. 2, prevent further tilting of the body about the pivots 15, which may otherwise occur if the separating edge of member 32 could dig into the ground, and thus prevent lifting of the rear wheels 8 off the ground which would result in loss of traction.

To assist in unloading the body in addition to tilting it, the rear floor section 32 may be pivotally supported on the body 14 by means of a shaft 38, and the intermediate section 31 may include a member 39 pivotally supported on the shaft 36. The member 39 and section 32 may be operated simultaneously to a position indicated in dotted lines in Fig. 1. To this end the shafts 36 and 38 may be provided with crank arms 40 and 41 connected to each other by a link 42, so that when the raising of the body is started, after dumping, the material still remaining on the section 32 and member 39 swings said sections, to open the bottom, to the dotted line position (Fig. 1) to thus completely empty the body. The section 32 and member 39 are locked in their closed position in a manner hereinafter described, to prevent accidental opening of the floor while material is being carried.

To return the section 32 and member 39 to closed position there may be provided a ratchet 43 operable by a lever 44 through the medium of a feed pawl 45. The ratchet is connected to a sprocket 46 to drive a chain 47 to rotate a sprocket 48 connected to the arm 40 to actuate the latter and the arm 41 through the link 42 to swing the section 32 and the member 39 to closed position. The closing of the bottom may be effected while the body is returning from the dotted line position (Fig. 1) to normal. The member 39 may be provided with a bent up edge 39a to overlap the end of the section 32 to act as a seal to prevent leakage of material from the body and help to support the free end of the section 32. A holding pawl, not shown, may cooperate with the ratchet 43 to lock the member 39 and section 32 in closed position. To release the member 39 and section 32 the holding pawl (not shown) is disengaged from the ratchet 43 at will.

It will be understood that since the sprocket 48 is carried by the body the chain 47 swings about the sprocket 46 during the tilting of the body, there being sufficient looseness in the chain to permit a slight stretching of the chain while swinging to its lowermost position.

While certain preferred embodiments of this device have been shown and described, it will be understood that changes in the form, arrangements, proportions, sizes and details thereof may be made without departing from the scope of the invention as defined in the appended claims.

I claim:

1. A truck including a frame, a scoop shaped body tiltably supported on the frame so that it may occupy a carrying position and a scooping position, the body being so arranged on the truck that it may be pushed into a pile of material by backing up the truck, means including a brace, and means on said frame to be engaged by the brace to prevent further tilting of the body when in its scooping position to prevent the edge of the body from digging into the ground.

2. A truck including a frame, a scoop shaped body tiltably supported on the frame so that it may occupy a carrying position and a scooping position, the body being so arranged on the truck that it may be pushed into a pile of material by backing up the truck, means including a link pivotally supported on the body, and means secured to the frame to be engaged by said link to brace the body while in its scooping position to reenforce the latter.

3. A truck including a frame, a scoop shaped body tiltably supported on the frame so that it may occupy a carrying position and a scooping position, the body being so arranged on the truck that it may be pushed into a pile of material by backing up the truck, a rear axle, a fulcrum above the axle about which the body tilts, and a pair of links pivotally supported on the body to engage the axle and guided by the axle to their effective positions to brace the body in its scooping position.

4. A truck including a frame, a body, means to support the body in a manner to facilitate rearward tilting from a carrying position to a scooping position so that the body may be pushed into a pile of material for loading by backing up the truck, said body including three floor sections, a forward section substantially horizontal when the car is in carrying position, a rear section substantially horizontal or parallel with the ground when the body is in its scooping position, and an intermediate section joining the other two sections, and forming therewith obtuse angles, the rear sections and intermediate sections being effective to cause some of the material to slide forward in the body onto the forward section when the body is brought to carry position.

5. A truck including a frame, a body, means to support the body in a manner to facilitate rearward tilting from a carrying position to a scooping position so that the body may be pushed into a pile of material for loading by backing up the truck, said body including three floor sections, a forward section substantially horizontal when the car is in carrying position, a rear section substantially horizontal or parallel with the ground when the body is in its scooping position, and an intermediate section joining the other two sections and forming therewith obtuse angles, the rear sections and intermediate sections being effective to cause some of the material to slide forward in the body onto the forward section when the body is brought to carrying position, means to facilitate the tilting of the body to dump the material, a fulcrum about which the rear section may be swung, a swingable member forming part of the intermediate section, the free end of the rear section and the swingable member normally engaging each other, and means to operate said swingable member and said rear section to open the rear end of the floor to assist in discharging the material from the body.

6. A truck including a frame, a body pivotally supported on said truck so that it may be tilted from a carrying position to an unloading position, said body including a floor having pivoted sections which are locked when the body is in its carrying position, said sections being releasable so that they may open the bottom of the body to assist in unloading the material from the body during the initial part of the return movement of the body to normal.

7. A truck including a frame, a body tiltably supported on said frame so that it may be moved from its carrying position to dump the material therefrom at the back, a pivoted element forming part of the floor of said body, said element being substantially horizontal when the body is in its dumped position so as to readily work into the material to assist in loading the body when the latter is backed into a pile of material, said element being locked in position when the body is being loaded and releasable when the material is being discharged so that it may swing freely and assist in discharging the material during the initial part of the return movement of the truck to normal.

8. A truck including a frame, a body tiltably supported on the frame so that it may be swung from a carrying position to a scooping position, the body being arranged on the truck so that it may be pushed into a pile of material in order to load it, means including a brace to reenforce the body in its loading position, an abutment with which said brace cooperates, and means to guide said brace into engagement with said abutment while the body is being tilted to its loading position.

9. A truck including a frame, a body tiltably supported on the frame so that it may be swung from a carrying position to a scooping position, the body being arranged on the truck so that it may be pushed into a pile of material in order to load it, means including a link to brace the body in its loading position, an abutment with which the link engages, said link being pivotally connected at one end to the body, and having an elongated slot at its other end to embrace the abutment to be guided thereby into proper cooperative relation with said abutment during the tilting of the body to its scooping position.

10. A truck including a frame, a pivot on said frame, a body tiltably supported on said pivot so that it may be moved from a carrying position to a scooping position, the center of gravity of the body being behind said pivot so that the body may be tilted by gravity to its scooping position, power means to back the truck and force the body into a pile of material to load the truck, means to move the body back to its carrying position, and means to connect the body moving means with said power means at will.

11. A truck including a frame, a scoop-like body carried on said frame and tiltable thereon from a carrying position to a dumping position, said body including two floor sections, one of said floor sections being substantially horizontal when the body is in its carrying position, the other section being inclined thereto so that it may be substantially horizontal while the body is in its loading position, to admit a maximum quantity of material into the body, said last mentioned section assisting in moving the material forwardly in the body while the latter is being restored to its carrying position.

12. A truck including a frame, a body thereon, a pivot on said frame for said body, said body having a portion extending rearwardly beyond the rear wheels of the truck, said body including a horizontal floor section, a pivoted section in the floor of the rearward extension of said body, means to release the body so that it may tilt by gravity, thus causing the material therein to slide from the horizontal floor section towards the pivoted floor section, and means to release said pivoted floor section to open the floor and thus discharge the material through the floor and behind said wheels.

13. In a truck, the combination of a frame, a scoop-shaped body, means to support said body on said frame so that it may be tilted from a carrying position to a scooping position in which latter position it may be pushed into a pile of material by backing up the truck, a separating edge rigid with the body, and means acting on the body to rigidly secure it to prevent further tilting thereof and thus prevent the separating edge from digging into the ground.

FLOYD R. WOOSTER.